(12) United States Patent
Deng (10) Patent No.: US 10,129,305 B2
(45) Date of Patent: *Nov. 13, 2018

(54) METHOD, USER EQUIPMENT, SERVER, AND APPARATUS FOR IMPLEMENTING INFORMATION SHARING

(71) Applicant: Huawei Device (Dongguan) Co., Ltd., Dongguan (CN)

(72) Inventor: Junjie Deng, Shenzhen (CN)

(73) Assignee: Huaei Device (Dongguan) Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,988

(22) Filed: Mar. 21, 2017

(65) Prior Publication Data

US 2017/0195380 A1    Jul. 6, 2017

Related U.S. Application Data

(63) Continuation of application No. PCT/CN2012/076846, filed on Jun. 13, 2012, and a
(Continued)

(51) Int. Cl.
*G06F 15/16* (2006.01)
*H04L 29/06* (2006.01)
(Continued)

(52) U.S. Cl.
CPC ........ *H04L 65/403* (2013.01); *H04L 67/1095* (2013.01); *H04L 67/18* (2013.01);
(Continued)

(58) Field of Classification Search
CPC . H04L 47/14; H04L 41/0893; H04L 41/5029; H04L 41/0896; H04L 47/20;
(Continued)

(56) References Cited

U.S. PATENT DOCUMENTS 6,601,087 B1    7/2003   Zhu et al.
7,383,308 B1    6/2008   Groves et al.
(Continued)

FOREIGN PATENT DOCUMENTS

CN    101535973 A    9/2009
CN    101674110 A    3/2010
(Continued)

OTHER PUBLICATIONS

Machine Translation and Abstract of Chinese Publication No. CN101674110, Mar. 17, 2010, 9 pages.
(Continued)

*Primary Examiner* — Djenane M Bayard
(74) *Attorney, Agent, or Firm* — Conley Rose, P.C.

(57) ABSTRACT

A method, a user equipment, and a server for sharing information, and an apparatus. The method for implementing information sharing includes receiving shared information of another user equipment and location information corresponding to the shared information, where the location information indicates a location for the shared information to be displayed on a desktop of another user equipment; and displaying the shared information according to the location information. In the embodiments of the present disclosure, information or a desktop can be shared in real time between two or more user equipments, so that a user of a user equipment is capable of tracing the status of a user of another user equipment and acquiring information on the shared desktop in real time.

19 Claims, 4 Drawing Sheets

Related U.S. Application Data continuation of application No. 13/731,250, filed on Dec. 31, 2012, now Pat. No. 9,641,568.

(51) Int. Cl.
*H04L 29/08* (2006.01)
*H04W 4/02* (2018.01)

(52) U.S. Cl.
CPC .............. *H04L 67/22* (2013.01); *H04L 67/24* (2013.01); *H04L 67/38* (2013.01); *H04W 4/02* (2013.01)

(58) Field of Classification Search
CPC ............. H04L 41/5054; H04L 12/1492; H04L 12/1496; H04L 41/5006; H04L 41/5022; H04L 47/2425; H04L 47/2475; H04L 47/803; H04L 47/805; H04L 47/822; H04L 47/824; H04L 43/0876; H04L 67/1095; H04L 12/1485; H04L 41/5019
See application file for complete search history.

(56) References Cited

U.S. PATENT DOCUMENTS

| | | | |
|---|---|---|---|
| 2004/0252185 | A1 | 12/2004 | Vernon et al. |
| 2006/0010392 | A1 | 1/2006 | Noel et al. |
| 2006/0061468 | A1 | 3/2006 | Ruha |
| 2006/0190826 | A1 | 8/2006 | Montgomery et al. |
| 2007/0078953 | A1* | 4/2007 | Chai .................. G06F 9/4443 709/219 |
| 2007/0214423 | A1* | 9/2007 | Teplov ................ G06F 3/1454 715/751 |
| 2009/0094339 | A1* | 4/2009 | Allen ................ H04L 67/1095 709/206 |
| 2012/0036199 | A1 | 2/2012 | Slee et al. |
| 2012/0062688 | A1 | 3/2012 | Shen et al. |
| 2012/0077586 | A1 | 3/2012 | Pishevar |
| 2012/0269185 | A1 | 10/2012 | Castleman et al. |
| 2012/0311010 | A1 | 12/2012 | Shah |
| 2013/0091558 | A1 | 4/2013 | Kim et al. |
| 2013/0117432 | A1 | 5/2013 | Jiang |
| 2013/0124619 | A1* | 5/2013 | Steakley ................ G06F 8/61 709/203 |
| 2013/0144950 | A1 | 6/2013 | Sanakaranarasimhan et al. |
| 2014/0129637 | A1* | 5/2014 | Rohrs .................... G06Q 30/06 709/204 |
| 2014/0344346 | A1 | 11/2014 | Lee et al. |

FOREIGN PATENT DOCUMENTS

| | | |
|---|---|---|
| CN | 101883140 A | 11/2010 |
| CN | 101888519 A | 11/2010 |
| CN | 102143156 A | 8/2011 |
| WO | 2004077207 A2 | 9/2004 |

OTHER PUBLICATIONS

Machine Translation and Abstract of Chinese Publication No. CN101883140, Nov. 10, 2010, 9 pages.
Machine Translation and Abstract of Chinese Publication No. CN101888519, Nov. 17, 2010, 10 pages.
Ichimura, S., et al., "Lightweight Desktop-Sharing System for Web Browsers," XP010821214, IEEE Computer Society, Jul. 4, 2005, 6 pages.
Foreign Communication From a Counterpart Application, European Application No. 12768522.0, Extended European Search Report dated Oct. 7, 2013, 10 pages.
Foreign Communication From a Counterpart Application, European Application No. 16176552.4, Extended European Search Report dated Mar. 29, 2017, 8 pages.
Foreign Communication From a Counterpart Application, PCT Application No. PCT/CN2012/076846, English Translation of International Search Report dated Aug. 16, 2012, 2 pages.
Foreign Communication From a Counterpart Application, PCT Application No. PCT/CN2012/076846, English Translation of Written Opinion dated Aug. 16, 2012, 14 pages.
Notice of Allowance dated Dec. 19, 2016, 11 pages, U.S. Appl. No. 13/731,250, filed Dec. 31, 2012.
Office Action dated Feb. 10, 2015, 3 pages, U.S. Appl. No. 13/731,250, filed Dec. 31, 2012.
Office Action dated Mar. 4, 2016, 5 pages, U.S. Appl. No. 13/731,250, filed Dec. 31, 2012.
Office Action dated Apr. 24, 2013, 28 pages, U.S. Appl. No. 13/731,250, filed Dec. 31, 2012.
Office Action dated Nov. 24, 2014, 12 pages, U.S. Appl. No. 13/731,250, filed Dec. 31, 2012.
Office Action dated Jun. 16, 2015, 15 pages, U.S. Appl. No. 13/731,250, filed Dec. 31, 2012.

* cited by examiner

METHOD, USER EQUIPMENT, SERVER, AND APPARATUS FOR IMPLEMENTING INFORMATION SHARING

CROSS-REFERENCE TO RELATED APPLICATIONS

This application is a continuation of U.S. patent application Ser. No. 13/731,250, filed on Dec. 31, 2012, which is a continuation of International Patent Application No. PCT/CN2012/076846, filed on Jun. 13, 2012. All of the aforementioned patent applications are hereby incorporated by reference in their entireties.

TECHNICAL FIELD

Embodiments of the present disclosure relate to the field of communications, and in particular to a method, a user equipment, and a server for implementing information sharing, and an apparatus for implementing desktop sharing.

BACKGROUND

With the popularity of mobile terminals, a user equipment, for example, a mobile phone, has become a center for processing personal information and a medium for contacting others. For particularly-concerned contact persons, a user always wants to know what they are doing, for example, what songs they are listening to, what games they are playing, where they are, and how the weather is there; or when being in a certain group, the user wants to know what members in the group are doing. At the same time, the user may have expectation of sharing a current behavior of the user itself.

However, BLUETOOTH can only be used to implement simple file sharing, and cannot meet a real-time sharing requirement. Alternatively, the manner for implementing remote desktop sharing using a remote desktop similar to a MICROSOFT WINDOWS system also can only be used to view and control a remote terminal, and cannot be used to acquire content of a file of an opposite party.

SUMMARY

Embodiments of the present disclosure provide a method, a user equipment, a server for implementing information sharing, and an apparatus for implementing desktop sharing, so as to share or acquire information or a desktop in real time.

In one aspect, a method for implementing information sharing is provided, including receiving shared information of another user equipment and location information corresponding to the shared information, where the location information indicates a location for the shared information to be displayed on a desktop of the another user equipment; and displaying the shared information according to the location information.

In another aspect, a method for implementing information sharing is provided, including sending, to a cloud server, at least one piece of shared information, location information corresponding to the shared information, and indication information used to indicate at least one sharing object that is capable of acquiring the at least one piece of shared information, where the location information indicates a location for the shared information to be displayed on a desktop of a user equipment.

In another aspect, a method for implementing information sharing is provided, including receiving and storing shared information, location information corresponding to the shared information, and indication information used to indicate at least one sharing object that is capable of acquiring the shared information, which are sent by a first user equipment, where the location information indicates a location for the shared information to be displayed on a desktop of the first user equipment.

In another aspect, a user equipment for implementing information sharing is provided, including a first receiving unit configured to receive shared information of another user equipment and location information corresponding to the shared information, where the location information indicates a location for the shared information to be displayed on a desktop of another user equipment; and a displaying unit configured to display the shared information according to the location information.

In another aspect, a user equipment for implementing information sharing is provided, including a second sending unit configured to send, to a cloud server, at least one piece of shared information, location information corresponding to the shared information, and indication information used to indicate at least one sharing object that is capable of acquiring the at least one piece of shared information, where the location information indicates a location for the shared information to be displayed on a desktop of the user equipment.

In another aspect, a server for implementing information sharing is provided, including a third receiving unit configured to receive and store shared information, location information corresponding to the shared information, and indication information used to indicate at least one sharing object that is capable of acquiring the shared information, which are sent by a first user equipment, where the location information indicates a location for the shared information to be displayed on a desktop of the first user equipment.

In another aspect, an apparatus for implementing desktop sharing is provided, including, a capturing module configured to capture information about a first change of shared information on a desktop of a user equipment and/or of location information corresponding to the shared information, where the location information indicates a location for the shared information to be displayed on the desktop of the user equipment; and a sending module configured to send the information about the first change to a cloud server for storage.

In the embodiments of the present disclosure, information or a desktop can be shared in real time between two or more user equipments, so that a user of a user equipment is capable of tracing the status of a user of another user equipment and acquiring information on a shared desktop in real time.

BRIEF DESCRIPTION OF THE DRAWINGS

To illustrate the technical solutions in the embodiments of the present disclosure more clearly, the following briefly describes the accompanying drawings needed for describing the embodiments. The accompanying drawings in the following description merely show some embodiments of the present disclosure, and persons skilled in the art may derive other drawings from these accompanying drawings without creative efforts.

DETAILED DESCRIPTION

The following clearly describes the technical solutions according to the embodiments of the present disclosure with reference to the accompanying drawings in the embodiments of the present disclosure. The embodiments in the following description are merely a part rather than all of the embodiments of the present disclosure. All other embodiments obtained by persons skilled in the art based on the embodiments of the present disclosure without creative efforts shall fall within the protection scope of the present disclosure.

Technical solutions in the present disclosure may be applied to various communications systems, for example, a Global System for Mobile Communications (GSM), a Code Division Multiple Access (CDMA) system, a Wideband Code Division Multiple Access (WCDMA) system, a General Packet Radio Service (GPRS) system, and a Long Term Evolution (LTE) system.

A user equipment may also be called a mobile terminal, a mobile user equipment, and the like, and may communicate with one or more core networks through a radio access network (RAN). The user equipment may be a mobile terminal, for example, a mobile phone (alternatively called a "cellular" phone) and a computer equipped with a mobile terminal. For example, it may be a portable, pocket, hand-held, computer-embedded, or vehicle-mounted mobile apparatus, which exchanges language and/or data with the radio access network.

A base station may be a base transceiver station (BTS) in the GSM or CDMA, a NodeB in the WCDMA, or an evolved NodeB (eNB or e-NodeB) in the LTE.

A user may share resources on a user equipment of the user, where the resources are, for example, an application, a program parameter, and a file, store shared information corresponding to the resources onto a cloud server, and authorize another user to download the resources. The user providing the shared information is called a sharer, and an authorized user is called a sharing object. The shared information may be one or more of the following types of information: a network link, an application operation parameter, and a file.

Figure 1:
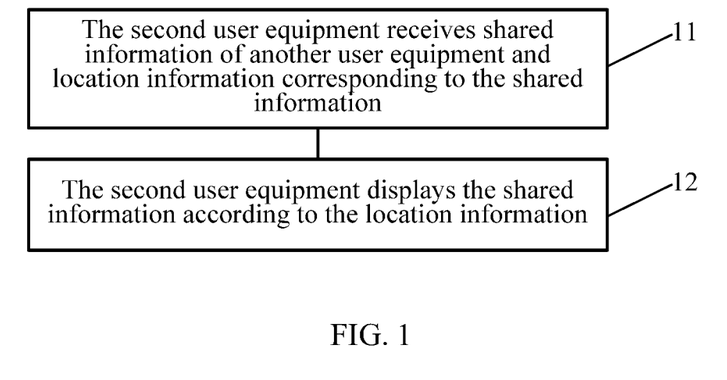
FIG. 1 is a flow chart of a method for implementing information sharing according to an embodiment of the present disclosure.

The following describes a method for implementing information sharing according to an embodiment of the present disclosure with reference to FIG. 1, which includes the following steps. In this embodiment, user equipments are taken as an example for description. Users interact with a cloud server using the user equipments. A first user equipment is a sharer, and a second user equipment is a sharing object of the first user equipment.

11. The second user equipment receives shared information of another user equipment and location information corresponding to the shared information, where the location information indicates a location for the shared information to be displayed on the another user equipment.

Here, the shared information includes but is not limited to one or more of the following types of information: a network link, an application operation parameter, and a file. The network link may be an address for downloading an application, an address for downloading a Moving Picture Experts Group Audio Layer III (mp3) file, and the like. The application operation parameter may be, for example, time information, weather information, and region information that are loaded on a widget, and information about an audio file played in an audio player. The file may be, for example, an installation program file, a picture file, and an mp3 file.

The location information may include information that indicates a coordinate location for the shared information to be displayed on the desktop of the another user equipment. Further, when the another user equipment has multiple desktops, the location information may further include information that indicates a desktop identifier for the shared information to be displayed on the desktop of the another user equipment.

Generally, the second user equipment may receive, from the cloud server, the shared information of the another user equipment and the location information corresponding to the shared information, and may also receive, from a user equipment of the another user, the shared information and the location information corresponding to the shared information.

Generally, before receiving the shared information of the another user equipment and the location information corresponding to the shared information, the second user equipment may send a download request to the cloud server, where the download request indicates that shared information, which is stored by the another user equipment onto the cloud server, needs to be acquired. Then, the second user equipment receives the shared information of the another user equipment and the location information corresponding to the shared information, which are sent by the cloud server according to the download request. It should be understood that a user of the second user equipment may manually send the download request to the cloud server. Alternatively, the second user equipment may be equipped with a timer, so that download requests are periodically sent to the cloud server. In this way, if the shared information provided by the first user equipment is updated periodically, the shared information of the first user equipment acquired by the second user equipment is also updated periodically, thereby ensuring that the shared information on the two user equipments is basically synchronous.

The user of the second user equipment selects a blank desktop and initiates, on the desktop, the download request to the cloud server or the another user equipment. For example, the user of the second user equipment selects a "view sharing" option in the menu of the desktop. Then, the menu further provides a list of "contact persons" and an "all contact persons" option. If the user of the second user equipment selects one or more "contact persons" from the list of "contact persons", the download request initiated by the second user equipment to the cloud server indicates that shared information of the one or more "contact persons" needs to be acquired; if the user of the second user equipment selects "all contact persons", the download request initiated by the second user equipment to the cloud server indicates that shared information of all contact persons needs to be acquired, or the download request only indicates that shared information needs to be acquired, and after receiving the download request, the cloud server considers by default that the download request indicates that shared information of all contact persons of the second user equipment needs to be acquired.

The download request initiated by the second user equipment may indicate that shared information, which is stored by at least one user equipment (for example, the first user equipment) onto the cloud server, needs to be acquired; actually, the user may not need to indicate a user whose shared information needs to be acquired each time, and the user may set, on the side of the user equipment of the user itself, a sharer to which the download request points, for example, the first user equipment or another user equipment. If no sharer is set and when initiating the download request, the second user equipment does not indicate the user whose shared information needs to be acquired, it may be considered by default that the download request indicates that shared information of all sharers corresponding to the second user equipment needs to be acquired.

That is, if the download request indicates that shared information, which is stored by the first user equipment onto the cloud server, needs to be acquired, the second user equipment receives the shared information of the first user equipment and location information corresponding to the shared information, which are sent by the cloud server according to the download request.

Alternatively, if the download request indicates that specified shared information needs to be acquired, the second user equipment receives the specified shared information and location information corresponding to the shared information, which are sent by the cloud server according to the download request.

Alternatively, if the download request initiated by the second user equipment to the cloud server does not indicate that specified shared information needs to be acquired, the second user equipment receives description information of shared information, where the description information is sent by the cloud server; sends a request for acquiring specified shared information to the cloud server according to the description information; and finally receives the specified shared information and location information corresponding to the shared information, which are sent by the cloud server.

At this time, the first user equipment has sent, to the cloud server, at least one piece of shared information, location information corresponding to the shared information, and indication information used to indicate at least one sharing object that is capable of acquiring the at least one piece of shared information.

It should be understood that a user of the first user equipment may specify different shared information for different sharing objects. For example, the user of the first user equipment selects a "desktop sharing" option in the menu on the desktop. Then, the menu further provides a list of "contact persons". If the user of the first user equipment selects one or more "contact persons" from the list of "contact persons", the menu further provides options of shared information, for example "sharing a whole desktop" or "sharing part of content". If the user of the first user equipment selects "sharing a whole desktop", the first user equipment uploads all shared information of a selected desktop to the cloud server, and indicates, in the indication information, that the shared information is provided for the one or more "contact persons". If the user of the first user equipment selects "sharing part of content", the user of the first user equipment selects one or more pieces of shared information on the desktop. Then, the first user equipment uploads the one or more pieces of shared information to the cloud server, and indicates, in the indication information, that the shared information is provided for the one or more "contact persons".

For example, the indication information used to indicate at least one sharing object that is capable of acquiring the at least one piece of shared information indicates that sharing objects of the first user equipment include the second user equipment. It should be understood that after uploading the shared information, the location information, and the indication information to the cloud server, the first user equipment may further send a sharing notification message to a user equipment of the sharing object indicated in the indication information, so that the sharing object learns that the first user equipment provides the shared information.

In this way, in this embodiment, before sending the download request to the cloud server, the second user equipment may receive the sharing notification message from the another user equipment (that is, the first user equipment) that stores the shared information onto the cloud server, where the sharing notification message indicates that the another user equipment has stored the shared information onto the cloud server.

After receiving the download request sent by the second user equipment, the cloud server needs to authenticate the second user equipment, that is, check whether the second user equipment is in a list of sharing objects indicated in the indication information that is sent by the first user equipment. If it is determined that the second user equipment is a sharing object of the first user equipment, the cloud server may push the shared information of the first user equipment and the corresponding location information to the second user equipment according to the download request.

If the cloud server directly pushes the shared information and the corresponding location information, the second user equipment receives the shared information and the location information corresponding to the shared information, which are sent by the cloud server.

Alternatively, the cloud server may not push the shared information and the location information, and instead, provides description information of shared information for the second user equipment, for example, providing a list of shared information that is shared by the first user equipment with the second user equipment. The user of the second user equipment selects shared information expected to be acquired in the description information. Then, the second user equipment sends a request for acquiring specified shared information to the cloud server according to the selection of the user of the second user equipment. The cloud server pushes, to the second user equipment according to the request, the shared information selected by the user of the second user equipment and corresponding location information. At this time, the second user equipment receives the specified shared information and the location information corresponding to the shared information, which are sent by the cloud server.

12. Finally, the second user equipment displays the shared information according to the location information.

The first user equipment uploads the location information while uploading the shared information. Therefore, after receiving the shared information, the second user equipment may display the shared information on a desktop according to the location information. The location information includes coordinate location information. Therefore, it may be ensured that the location for the shared information to be displayed on the desktop of the second user equipment is basically the same as the location for the shared information to be displayed on the desktop of the first user equipment. The locations are "basically" the same because screen specifications of each user equipment may be different. In this case, the shared information may be displayed on the desktop of the second user equipment according to the coordination location information of the location for the shared information to be displayed on the desktop of the first user equipment, for example, an absolute coordinate or a relative coordinate ratio. The shared information may be displayed on a shared desktop in the form of an icon or a folder.

In addition, the first user equipment may choose to share information on its multiple desktops with the second user equipment. Therefore, the location information may further include desktop identifier information to identify a desktop, from which the shared information comes, of the first user equipment. This solves the problem of how to display, on the shared desktop of the second user equipment, shared information of different desktops but with the same coordinate location.

For example, the first user equipment sequentially shares information a and b on its desktop A and information c on its desktop B with the second user equipment. Assume that the coordinate location of information a on desktop A is the same as that of information c on desktop B. In this case, when the second user equipment requests, on a first desktop that is blank, acquisition of the shared information of the first user equipment, information a and information b are displayed on the first desktop, where the coordinate locations of information a and information b on the first desktop of the second user equipment are basically the same as that on desktop A of the first user equipment. Then, prompt information, for example, "The first user equipment further shares other information with you. Whether to acquire it or not", is displayed on the first desktop. If the user of the second user equipment selects "yes", a second desktop that is blank appears following the first desktop. Then, information c is displayed on the second desktop. As may be seen from the above, according to the location information, the second user equipment preferentially displays, on a same desktop, shared information with the same desktop identifier information according to the coordinate location information.

In the preceding embodiment, a sequence of displaying the shared information on the second user equipment is determined according to the time of uploading the shared information of the first user equipment. Information that is preferentially displayed on a first shared desktop may also be determined in another manner, for example, according to a download progress, priorities of shared information, and the like.

The preceding content is described based on the assumption that both the first user equipment and the second user equipment support desktop sharing. If the first user equipment or the second user equipment does not support desktop sharing, the shared information is not displayed on a desktop, and the shared information may be displayed in an interface module, for example, a folder, of the second user equipment.

After the shared information is displayed on the desktop, the user of the second user equipment may use the shared information to, for example, acquire a corresponding shared application through a network link.

The shared information may be a network link, an application operation parameter, a file, or the like. Therefore, the second user equipment may use the shared information to acquire an application, a file, or the like corresponding to the shared information. It should be understood that the shared information is not limited to the preceding examples, and any information that can be displayed on a desktop may be used as the shared information.

The shared information may be used in different ways. For example, if the shared information is a network link to an application, a corresponding application is acquired through the network link; if the shared information is a network link to an audio file, a corresponding audio file is acquired through the network link; if the shared information is an application operation parameter, the parameter is loaded on a corresponding application; and if the shared information is a file, the file is downloaded.

Actually, when the first user equipment shares an application and its operation parameter at the same time, the user of the second user equipment may choose to acquire the application, choose to acquire the application operation parameter, or choose to concurrently acquire the application and its operation parameter during downloading the shared information. During the process of using the shared information, the second user equipment detects whether it has installed the application. If the application has not been installed, the second user equipment installs the application and loads the parameter. If the second user equipment downloads the application corresponding to the application operation parameter when downloading the shared information, the application may be installed directly; if the second user equipment only downloads the application operation parameter when downloading the shared information, the corresponding application is downloaded from the network first when the application operation parameter is used, the application is then installed and operated, and the application operation parameter is loaded on the application. If the application has been installed, the second user equipment operates the installed application and loads the parameter. In this way, when the first user equipment periodically updates the application operation parameter used as the shared information, the second user equipment may also acquire the application operation parameter by periodically updating the application operation parameter.

For example, the first user equipment shares a weather widget with the second user equipment. In this case, the first user equipment shares a weather widget application and weather information with the second user equipment. When acquiring the weather widget application and the weather information, the second user equipment may first check whether a weather widget application on it is consistent with the weather widget application on the first user equipment. If not consistent, the weather widget application is downloaded and installed first, and then the weather information may be loaded on the new weather widget application. If the first user equipment periodically shares the weather widget application and the weather information, the second user equipment periodically acquires the weather widget application and the weather information. However, the second user equipment only needs to periodically update the weather information because the new weather widget application has been installed. In this way, the user of the second user equipment is capable of learning in real time the weather information of the location of the user of the first user equipment. Certainly, if the user of the first user equipment only shares the weather information, the second user equipment may loads the weather information on a desktop using its weather widget application. If the weather information is updated in real time, the user of the second user equipment is also capable of learning the weather information of the location of the user of the first user equipment.

As may be seen from the above, in this embodiment, information can be shared in real time between two or more user equipments, so that a user of a user equipment is capable of tracing the status of a user of another user equipment and acquiring information on a shared desktop in real time.

In a specific embodiment, after receiving the download request sent by the second user equipment for the first time, the cloud server may authenticate the second user equipment to check whether the second user equipment has the permission to access the cloud server and check whether the second user equipment is a sharing object of the user equipment that provides the shared information expected to be acquired in the download request. After the authentication succeeds (that is, the second user equipment has the permission to access the cloud server and is a sharing object of the user equipment that provides the shared information expected to be acquired in the download request. For example, the second user equipment indicates, in the download request, that the shared information of the first user equipment needs to be acquired. In this case, the cloud server checks whether the second user equipment has the permission to access the cloud server and is a sharing object of the first user equipment. Successful authentication indicates that the second user equipment has the permission to access the cloud server and is a sharing object of the first user equipment), the cloud server sends the shared information to the second user equipment. If the authentication fails, the cloud server notifies the second user equipment that the authentication fails.

Generally, if the download request indicates that the shared information, which is stored by the first user equipment onto the cloud server, needs to be acquired, the second user equipment receives the shared information of the first user equipment and the location information corresponding to the shared information, which are sent by the cloud server. Alternatively, if the download request indicates that specified shared information needs to be acquired, the second user equipment receives the specified shared information and the location information corresponding to the shared information, which are sent by the cloud server.

If the download request carries a specified requirement of shared information (for example, it may be specified, in the download request, that one or more pieces of shared information of the first user equipment need to be downloaded; and if no shared information is specified, it may be considered that all shared information of the first user equipment needs to be downloaded), the cloud server may directly push the shared information to the second user equipment. Alternatively, the download request may not indicate that specified shared information needs to be acquired and may indicate that the shared information of the first user equipment needs to be acquired. In this case, the cloud server sends description information of shared information to the second user equipment first, and then sends specified shared information to the second user equipment after the user specifies the shared information that needs to be downloaded. Therefore, that the second user equipment receives the shared information and the location information corresponding to the shared information, which are sent by the cloud server includes receiving the description information of the shared information, where the description information is sent by the cloud server; sending, to the cloud server according to the selection of the user, a request for acquiring the specified shared information; and receiving the specified shared information. Here, the description information lists all shared information that is shared by the first user equipment with the second user equipment.

That is, the user of the first user equipment shares resources such as an application and a file that are on the user equipment, and authorizes the second user equipment to be a sharing object. Then, the first user equipment stores the shared information onto the cloud server, and the second user equipment acquires the shared information from the cloud server. Contrarily, if the user of the second user equipment also shares resources such as an application and a file that are on the user equipment, and authorizes the first user equipment to be a sharing object, the second user equipment then stores the shared information onto the cloud server, and the first user equipment acquires the shared information from the cloud server.

As may be seen from the above, if the first user equipment and the second user equipment authorize each other to be a sharing object of each other, that is, both user equipments are sharing objects for each other. Then, the first user equipment or the second user equipment may acquire the shared information stored by the opposite party onto the cloud server.

Further, implementation of the shared information may not be limited to two user equipments, and a group with two or more user equipments may be involved. For example, in addition to the first user equipment and the second user equipment, the group may further include a third user equipment. Here, the first user equipment, the second user equipment, and the third user equipment are sharing objects of each other, that is, group sharing objects.

The second user equipment may display, according to the location information, the shared information of the first user equipment acquired from the cloud server. It should be understood that the shared information may be displayed on the same desktop or different desktops according to the desktop identifier information in the location information. Preferentially, shared information with the same desktop identifier information is displayed on the same desktop. In addition, the shared information may be displayed on a shared desktop in the form of an icon or a folder.

If more user equipments that are sharing objects of each other exist in the group, each of the user equipments may display, on their user equipments, shared information stored by other user equipments in the group onto the cloud server, and may also upload shared information on their own user equipments to the cloud server.

Generally, when receiving the download request initiated by the second user equipment, the cloud server may first determine whether the second user equipment has a record of subscribing to a desktop sharing service. If no, the cloud server rejects the download request of the second user equipment until the user of the second user equipment completes a registration process as stipulated by a provider of the "desktop sharing" service. Then, the cloud server further determines whether the second user equipment acquires the authentication of the first user equipment. If no, the cloud server rejects the download request of the second user equipment; and if yes, the cloud server delivers the shared information, which is authorized by the first user equipment and to be shared with the second user equipment, to the second user equipment.

After acquiring the shared information, the second user equipment may use the shared information displayed on the desktop or in another functional interface module. When the shared information clicked by the user of the second user equipment is a network link, the second user equipment may download the corresponding application or file according to the network link. When information is shared between the first user equipment and the second user equipment, an application or a file may not be directly shared, and instead, the manner of sharing a corresponding network link is adopted. This may save data traffic. When the shared information is an application operation parameter and may be data information such as weather, time, and region displayed on an operating widget, the second user equipment may directly apply the application operation parameter into a corresponding application in the user equipment. The application operation parameter may also be ID3 information (a data element used to describe music information, which generally refers to the singer, the album name, and the genre of an mp3 song). In this case, the second user equipment may search for a corresponding song through the network, download it, and load it to a music player for playing. If the application corresponding to the application operation parameter is not installed on the user equipment, the second user equipment downloads the corresponding application from the network, installs the application, and loads the application operation parameter onto the operating application. When the shared information is a file which may be a picture or an audio or video file, the second user equipment may directly open the file using corresponding software. The file may also be an application, and the second user equipment may install and operate the application.

In addition, it should be understood that the shared information may not only be downloaded onto the desktop of the second user equipment, and may also be added into any module providing the functional interface, such as a folder. For example, in a folder of the second user equipment, the user of the second user equipment chooses to enter a folder interface, and a subfolder, which is named, for example, "shared information", may be added on a details interface. When clicking the subfolder, the user of the second user equipment may view the shared information.

Whether the shared information is displayed on a desktop of a user equipment or in another interface module is determined according to the device model or version of the user equipment that acquires the shared information. However, the desktop where the shared information is displayed is determined according to the desktop, in which the user of the second user equipment initiates the download request, and the desktop identifier information in the location information that corresponds to the shared information. If the second user equipment has multiple desktops, the acquired at least one piece of shared information may be displayed on the shared desktop where the user of the second user equipment initiates the download request.

For a group, its user equipments may have a group shared desktop. When a user equipment downloads shared information on the group shared desktop, the user equipment has a group identity, and may view shared information of other members in the group on the group shared desktop. It should be understood that the shared information that comes from multiple group user equipments and is displayed on the group shared desktop may be displayed on the group shared desktop of a group user equipment according to the need of a group user that receives the shared information.

To sum up, according to the method for implementing information sharing in this embodiment, information can be shared in real time between two or more user equipments, so that a user of a user equipment is capable of tracing the status of a user of another user equipment and acquiring information on a shared desktop in real time.

Figure 2:
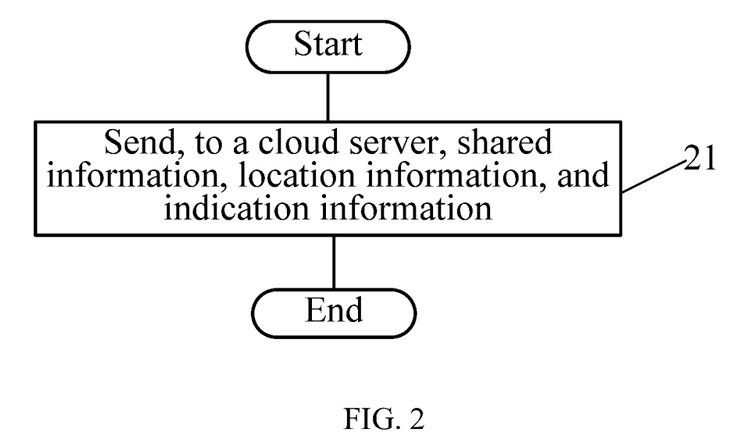
FIG. 2 is a flow chart of a method for implementing information sharing according to another embodiment of the present disclosure.

With reference to FIG. 2, the following describes a method for implementing information sharing by a first user equipment of an uploading party, including the following steps. For brevity, description that is the same as that in the preceding embodiment is omitted.

21. The first user equipment sends, to a cloud server, at least one piece of shared information, location information corresponding to the shared information, and indication information used to indicate at least one sharing object that is capable of acquiring the at least one piece of shared information, where the location information indicates a location for the shared information to be displayed on a desktop of the first user equipment.

Generally, the first user equipment may periodically send the at least one piece of shared information and the location information of the shared information to the cloud server for storage, and send a sharing notification message to a user equipment of the at least one sharing object indicated in the indication information, where the sharing notification message is used to notify the sharing object (for example, a second user equipment) that the first user equipment has stored the shared information onto the cloud server. In this way, a user of the second user equipment is capable of detecting in real time that the first user equipment has uploaded new shared information.

It should be understood that a user of the first user equipment may specify different shared information for different sharing objects. For example, the user of the first user equipment may specify that a first group of shared information is shared with a first group of sharing objects, and another group of shared information is shared with another group of sharing objects. The user of the first user equipment may randomly combine shared information according to the use's own need, and specify different combinations of shared information for different sharing objects.

Actually, the first user equipment needs to process data to be uploaded to the cloud server to ensure that the shared information is stored on the cloud server. For example, if the user of the first user equipment wants to share an application, the first user equipment uploads a network link corresponding to the application in an application store APP Store. For example, if the user of the first user equipment wants to share a song, the first user equipment uploads ID3 information of the song. For example, if the user of the first user equipment wants to share a network video, the first user equipment uploads the network link of a video network that provides the network video. For example, if the user of the first user equipment wants to share a picture, the first user equipment uploads the network link of a network album where the picture is located. For example, if the user of the first user equipment wants to share personal data, the first user equipment uploads the link of a network where the personal data is located. As may be seen from the above, data traffic may be saved according to the method for uploading "shared information".

Similarly, the second user equipment acquires the shared information from the cloud server, so that the second user equipment may use the shared information, for example, downloading relevant content according to a network link.

Generally, the user of the first user equipment may manually send an upload request to the cloud server. Alternatively, the first user equipment may be equipped with a timer, so that upload requests are periodically sent to the cloud server.

Actually, before the cloud server receives the shared information and the location information, the first user equipment may send the upload request to the cloud server to acquire user authentication of the cloud server.

For the first user equipment, the first user equipment sends the upload request to the cloud server first, and the cloud server performs user authentication on the first user equipment to determine whether the first user equipment has an upload permission. If the user authentication on the first user equipment succeeds, it indicates that the first user equipment has the upload permission. In this case, the content that needs to be uploaded may be uploaded to the cloud server and stored on the cloud server. Here, in addition to being manually initiated by the user of the first user equipment, the upload request may also be periodically initiated using a setting on the side of the first user equipment (for example, an upload request is initiated every 5 minutes). However, if the user authentication on the first user equipment fails, it indicates that the first user equipment does not have the upload permission. In this case, registration (for example short message registration or email registration) needs to be completed according to a registration process stipulated by a provider of the cloud service, so as to enable the user authentication to be successful. The registration process is a general registration process. It may be understood that the user authentication may be performed when the first user equipment performs initial uploading to the cloud server. Once the user authentication on the first user equipment by the cloud server succeeds, the user authentication does not need to be performed for subsequent uploading of shared information.

Most existing smart terminals support a multi-screen desktop. The multi-screen desktop may be divided into a primary desktop and a secondary desktop. The primary desktop is generally a centered desktop, and generally used to place information that is viewed by a user frequently, for example small window components about weather and time, a most commonly used shortcut, and the like. Desktops other than the primary desktop may all be called secondary desktops. The secondary desktop is also a part of the multi-screen desktop.

In addition, the manner in which the shared information shared by the first user equipment with the second user equipment is displayed on the second user equipment depends on the device model of the second user equipment. If the device model of the second user equipment supports a multi-screen desktop, the shared information may be displayed directly on a desktop of the second user equipment. The desktop where the shared information is displayed is determined according to the desktop where the user of the second user equipment initiates a download request. For example, if the user of the second user equipment initiates the download request on the primary desktop, the shared information is displayed on the primary desktop; if the user of the second user equipment initiates the download request on the secondary desktop, the shared information is displayed on the secondary desktop. In addition, if the device model of the second user equipment does not support desktop sharing, and only supports folder sharing, shared information of files such pictures and music may be displayed in a particular folder on a file manager.

To sum up, according to the method for implementing information sharing in this embodiment, information can be shared in real time between two or more user equipments, so that a user of a user equipment is capable of tracing the status of a user of another user equipment and acquiring information on a shared desktop in real time.

Figure 3:
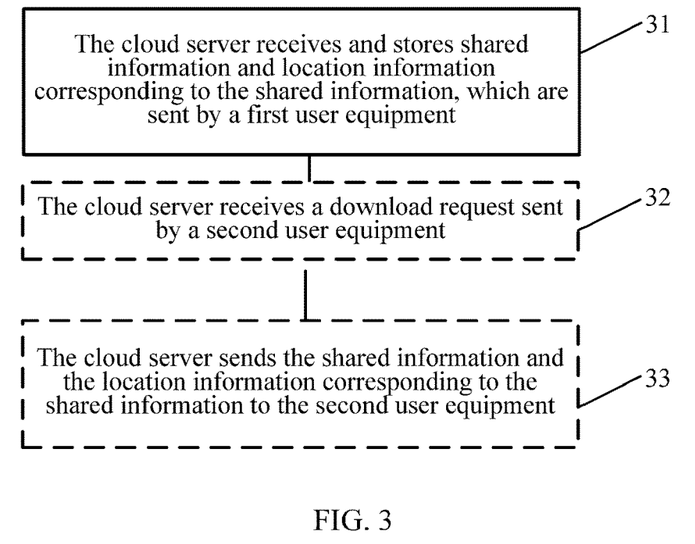
FIG. 3 is a flow chart of a method for implementing information sharing according to another embodiment of the present disclosure.

According to the preceding description, the following describes a method for implementing information sharing by a cloud server with reference to FIG. 3. Content that is the same as the method for implementing information sharing on the side of a user equipment in the preceding embodiment is omitted. The method for implementing information sharing in this embodiment includes the following steps.

31. The cloud server receives and stores shared information, location information corresponding to the shared information, and indication information used to indicate at least one sharing object that is capable of acquiring the shared information, which are sent by a first user equipment, where the location information indicates a location for the shared information to be displayed on a desktop of the first user equipment.

As described above, after the cloud server determines that user authentication on the first user equipment is successful and thus the first user equipment has an upload permission, the cloud server receives and stores at least one piece of shared information, location information corresponding to the shared information, and indication information used to indicate at least one sharing object that is capable of acquiring the at least one piece of shared information, which are sent by the first user equipment.

32. Alternatively, the cloud server further receives a download request sent by a second user equipment, where the download request indicates that shared information of at least one user including a first user is expected to be acquired.

33. Finally, the cloud server may send the shared information and the location information corresponding to the shared information to the second user equipment.

Preferentially, the cloud server may periodically send the shared information and the location information corresponding to the shared information to the second user equipment.

As described above, after receiving the download request, the cloud server may authenticate the second user equipment to check whether the second user equipment has the permission to access the cloud server and whether the second user equipment is a sharing object of the first user equipment. After the authentication succeeds (that is, the second user equipment has the permission to access the cloud server and is a sharing object of the first user equipment), the shared information and the location information are sent to the second user equipment. If the authentication fails, the cloud server notifies the second user equipment that the authentication fails.

If the cloud server determines, according to the indication information, that the second user equipment is a sharing object of the first user equipment, the shared information and the location information corresponding to the shared information are sent to the second user equipment, where the shared information includes shared information of the first user equipment. If the cloud server determines, according to the indication information, that the second user equipment is not a sharing object of the first user equipment, the shared information and the location information corresponding to the shared information are sent to the second user equipment, where the shared information does not include the shared information of the first user equipment.

In addition, if the download request carries a specified requirement of shared information (for example, the user of the second user equipment specifies, in the download request, certain shared information to be downloaded; if no shared information is specified, it may be considered that all shared information of the first user equipment needs to be downloaded), the cloud server may directly push the shared information to the second user equipment. Alternatively, the download request may not carry the specified requirement of shared information. In this case, the cloud server sends description information of shared information to the second user equipment first, the second user equipment sends a specified requirement to the cloud server after the user of the second user equipment specifies shared information that needs to be downloaded, and then the cloud server sends specified shared information to the second user equipment.

To sum up, according to the method for implementing information sharing in this embodiment, information can be shared in real time between two or more user equipments, so that a user of a user equipment is capable of tracing the status of a user of another user equipment and acquiring information on a shared desktop in real time.

Figure 4:
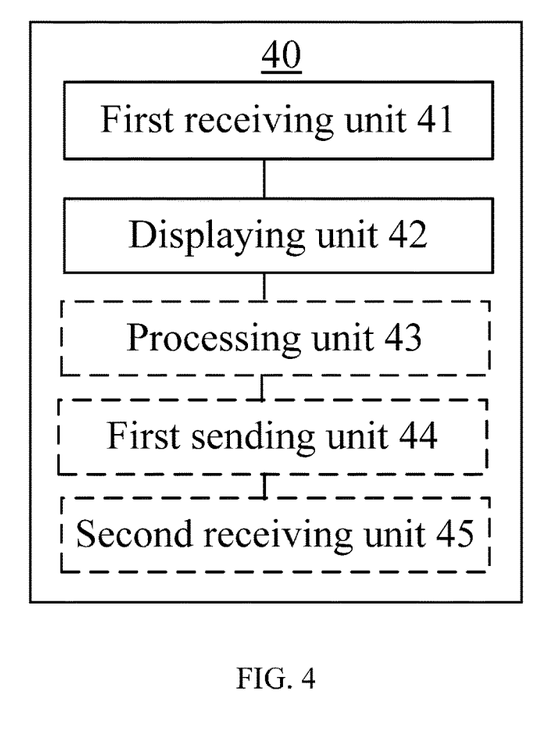
FIG. 4 is a schematic structural diagram of a user equipment for implementing information sharing according to an embodiment of the present disclosure.
Figure 5:
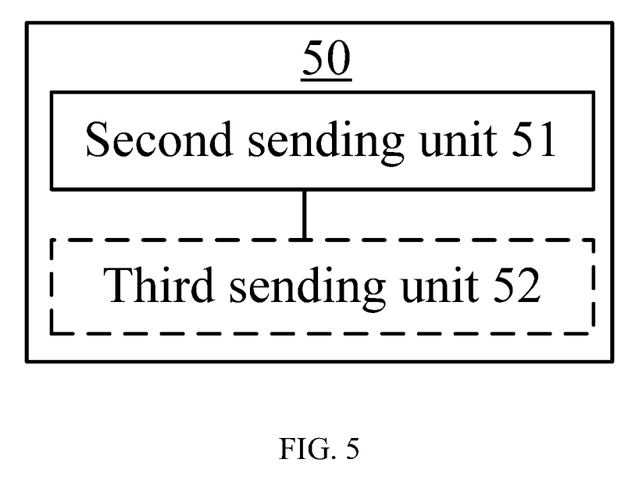
FIG. 5 is a schematic structural diagram of another user equipment for implementing information sharing according to an embodiment of the present disclosure.
Figure 6:
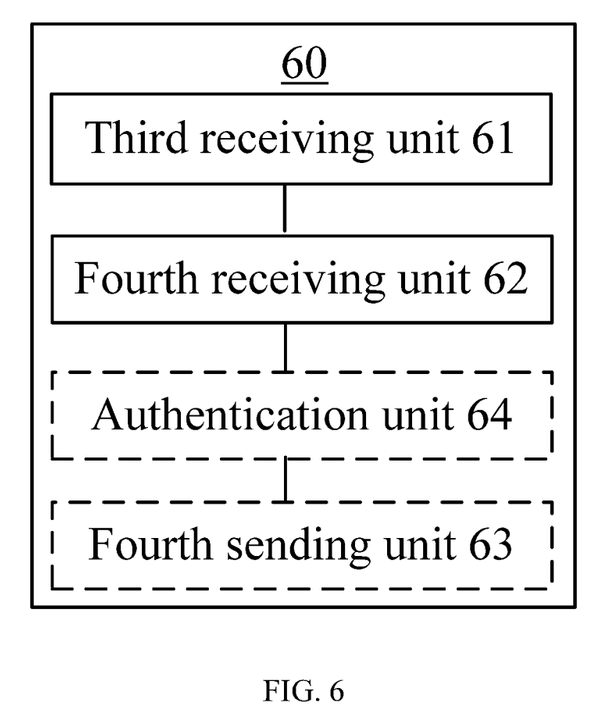
FIG. 6 is a schematic structural diagram of a cloud server for implementing information sharing according to an embodiment of the present disclosure.

The following describes a user equipment and a cloud server for implementing information sharing according to embodiments of the present disclosure with reference to FIG. 4 to FIG. 6.

In FIG. 4, a user equipment 40 for implementing desktop sharing includes a first receiving unit 41 and a displaying unit 42. The first receiving unit 41 is configured to receive shared information of another user equipment and location information corresponding to the shared information, where the location information indicates a location for the shared information to be displayed on a desktop of another user equipment. The displaying unit 42 is configured to display the shared information according to the location information.

Alternatively, the first receiving unit 41 is configured to receive, from a cloud server, the shared information of the another user equipment and the location information corresponding to the shared information, or receive, from a user equipment of the another user, the shared information and the location information corresponding to the shared information.

Here, the shared information includes but is not limited to one or more of the following types of information: a network link, an application operation parameter, and a file. The location information includes information that indicates a coordinate location for the shared information to be displayed on the desktop of the another user equipment. Further, when the another user equipment has multiple desktops, the location information may further include information that indicates a desktop identifier for the shared information to be displayed on the desktop of the another user equipment.

Alternatively, the displaying unit 42 is configured to display shared information with the same desktop identifier information on the same desktop according to the location information and the coordinate location information. In addition, the displaying unit 42 is configured to display the shared information in the form of an icon or a folder according to the location information.

In addition, the user equipment 40 for implementing desktop sharing may further include a processing unit 43 configured to use the shared information. The processing unit 43 is configured to, when the shared information is a network link, acquire a corresponding application or file through the network link; when the shared information is an application operation parameter, load the parameter; or when the shared information is a file, download the file.

That the processing 43 is configured to, when the shared information is an application operation parameter, load the parameter, which includes, when the shared information is an application operation parameter, checking whether a shared application used to load the parameter has been installed; and if the shared application has been installed, loading the parameter; or if the shared application has not been installed, acquiring the corresponding application and loading the parameter on the application.

In addition, the user equipment 40 for implementing desktop sharing may further include a first sending unit 44 configured to send a download request to the cloud server before the shared information of the another user equipment and the location information corresponding to the shared information are received, where the download request indicates that the shared information, which is stored by the another user equipment onto the cloud server, needs to be acquired. At this time, the first receiving unit 41 is configured to receive the shared information of the another user equipment and the location information corresponding to the shared information, which are sent by the cloud server according to the download request.

Generally, the first sending unit 44 periodically sends a download request to the cloud server.

Alternatively, the download request sent by the first sending unit 44 indicates that shared information, which is stored by a first user equipment onto the cloud server, needs to be acquired; then, the first receiving unit 41 receives the shared information of the first user equipment and location information corresponding to the shared information, which are sent by the cloud server according to the download request.

Alternatively, the download request sent by the first sending unit 44 indicates that specified shared information needs to be acquired; then, the first receiving unit 41 receives the specified shared information and location information corresponding to the shared information, which are sent by the cloud server according to the download request.

Alternatively, the first receiving unit 41 may receive description information of shared information, where the description information is sent by the cloud server; then send, to the cloud server according to the description information, a request for acquiring specified shared information; and finally receive the specified shared information and location information corresponding to the shared information, which are sent by the cloud server.

Alternatively, the user equipment 40 for implementing desktop sharing may further include a second receiving unit 45 configured to, before the first sending unit 44 sends the download request to the cloud server, receive a sharing notification message from the another user equipment that stores the shared information onto the cloud server, where the sharing notification message indicates that the another user equipment has stored the shared information onto the cloud server.

As may be seen from the above, according to the user equipment in this embodiment, information can be shared in real time between two or more user equipments, so that a user of a user equipment is capable of tracing the status of a user of another user equipment and acquiring information on a shared desktop in real time.

In FIG. 5, a user equipment 50 for implementing information sharing includes a second sending unit 51. The second sending unit 51 is configured to send, to a cloud server, at least one piece of shared information, location information corresponding to the shared information, and indication information used to indicate at least one sharing object that is capable of acquiring the at least one piece of shared information, where the location information indicates a location for the shared information to be displayed on a desktop of the user equipment. Here, the shared information includes but is not limited to one or more of the following types of information: a network link, an application operation parameter, and a file.

Further, the second sending unit 51 periodically sends at least one piece of shared information and location information corresponding to the shared information to the cloud server.

In addition, the user equipment 50 for implementing information sharing may further include a third sending unit 52 configured to send a sharing notification message to a user equipment of the at least one sharing object indicated in the indication information, where the sharing notification message is used to notify that the shared information has been stored on the cloud server.

As may be seen from the above, according to the user equipment in this embodiment, information can be shared in real time between two or more user equipments, so that a user of a user equipment is capable of tracing the status of a user of another user equipment and acquiring information on a shared desktop in real time.

The foregoing separately describes the user equipment 50 that uploads shared information and the user equipment 40 that downloads shared information. It should be understood that a user equipment that supports both uploading shared information and downloading shared information may have the functional modules and units of the user equipment 40 and the user equipment 50 at the same time.

FIG. 6 is a schematic structural diagram of a cloud server for implementing information sharing.

In FIG. 6, a cloud server 60 for implementing information sharing includes a third receiving unit 61 configured to receive and store shared information, location information corresponding to the shared information, and indication information used to indicate at least one sharing object that is capable of acquiring the shared information, which are sent by a first user equipment, where the location information indicates a location for the shared information to be displayed on a desktop of the first user equipment. Here, the shared information includes but is not limited to one or more of the following types of information: a network link, an application operation parameter, and a file.

In addition, the cloud server 60 for implementing information sharing may further include a fourth receiving unit 62 and a fourth sending unit 63. The fourth receiving unit 62 is configured to receive a download request of a second user equipment, where the download request indicates that shared information of at least one user equipment including the first user equipment needs to be acquired. The fourth sending unit 63 is configured to send the shared information and location information corresponding to the shared information to the second user equipment.

In addition, the cloud server 60 for implementing information sharing may further include an authentication unit 64 configured to, after the fourth receiving unit 62 receives the download request sent by the second user equipment and before the fourth sending unit 63 sends the shared information and the location information corresponding to the shared information to the second user equipment, determine, according to the indication information, whether the second user equipment is a sharing object of the first user equipment. If the authentication unit 64 determines that the second user equipment is a sharing object of the first user equipment, the fourth sending unit 63 is configured to send the shared information and the location information corresponding to the shared information to the second user equipment, where the shared information includes shared information of the first user equipment. Alternatively, if the authentication unit 64 determines that the second user equipment is not a sharing object of the first user equipment, the fourth sending unit 63 is configured to send the shared information and the location information corresponding to the shared information to the second user equipment, where the shared information does not include the shared information of the first user equipment.

Generally, the fourth sending unit 63 periodically sends the shared information and the location information corresponding to the shared information to the second user equipment.

As may be seen from the above, the cloud server in this embodiment is capable of implementing information sharing between two or more user equipments, so that a user of a user equipment is capable of tracing the status of a user of another user equipment and acquiring information on a shared desktop in real time.

On the basis of implementing information sharing, the following describes a method for implementing desktop sharing with reference to a specific embodiment. For ease of description, the following takes desktop sharing between only two users as an example. It should be understood that a method for implementing desktop sharing between more users is similar to that for implementing desktop sharing between two users. Similarly, a first user is a provider who provides shared information, and a second user is a sharing object of the first user.

In the specific embodiment of implementing desktop sharing, a special desktop (herein after referred to as super_launcher) is proposed. The special desktop super_launcher replaces an existing desktop (launcher) of an operating system of a smart terminal. The special desktop super_launcher may collect various information including shortcuts of a wallpaper, time, and the like, or an application corresponding to a small window component widget and corresponding location information. All particular activities performed by the first user on the special desktop super_launcher are recorded and stored in a database on a cloud server.

For example, if the first user replaces the wallpaper of a desktop, a joint photographic experts group Joint Photographic Experts Group (JPEG) picture of a new wallpaper after the replacement, and exchangeable image file format Exchangeable image file format (EXIF) information and location information of the picture are all stored in the database on the cloud server. If the first user installs an application and creates a shortcut of the application on the special desktop super_launcher, the name, version, icon, and location information of the application corresponding to the shortcut are recorded in the database on the cloud server. If the first user adds a small window component widget on the special desktop super_launcher, the name, icon, and location information of the application corresponding to the small window component widget are recorded in the database on the cloud server.

For another example, if the first user performs an activity using a widget on the special desktop super_launcher, for example, playing a song of an mp3 format, ID3 information of the song being played is to be updated to the database on the cloud server in real time. To avoid an oversize database, the database only records the ID3 information of the mp3 song being played by the first user.

A user equipment using the super_launcher may connect to the cloud server (herein after referred to as super_launcher server) using a private account. When the second user initiates a desktop sharing request to the first user, the super_launcher server performs user authentication on the second user and after the first user accepts the desktop sharing request, the super_launcher server pushes information stored in the database by the first user to the second user. A special desktop super_launcher of a user equipment of the second user displays the acquired shared information of the first user according to the corresponding location information. If the second user is interested in some content in the shared information of the first user and wants to own a certain application on a special desktop super_launcher of a user equipment of the first user, the second user may click a corresponding icon of the shared application formed on the user equipment of the second user, and then the user equipment of the second user downloads the corresponding application from an application store APP Store onto the user equipment of the second user according to application information (application name and version) corresponding to the icon.

It should be noted that if the application system of the user equipment of the second user does not support the special desktop super_launcher, the second user is only capable of acquiring part of shared information from the super_launcher server, that is, the desktop launcher of the user equipment of the first user cannot be generated using the desktop launcher of the user equipment of the second user, and only some downloadable shared information (for example ID3 or a network link) may be directly downloaded to a specified folder.

As may be seen from the above, an existing desktop launcher of a smart terminal already features extensibility and may implement common operations of applications by adding small window components widgets of various applications in addition to displaying common icons of shortcuts. For example, a small window component widget of a player on an Android system may implement play, pause of music, or the like.

If the cloud server synchronizes and acquires various information of a wallpaper, time, a shortcut, and an application that corresponds to a small window component on a desktop launcher of a smart terminal of the first user, and the first user selectively shares the data with a particular person (for example, the second user), the second user clicks an icon of the shared information and may find an original file or original data of a shared application using the shared information corresponding to the icon. In this way, desktop sharing may be implemented.

Desktop sharing may help users learn information of each other and easily view the information of each other without the need of real-time setting. The shared information may describe not only the environment (for example, the city, time, and weather) where a user is currently located but also a current operation of the user (for example, a song being listened to, a game being played, a photo being taken, or a place where the user is having a meal).

For example, user A and user B are a couple, user A is abroad for a business trip, and user B is at home. User A shares a clock widget (including the network link and time data of the clock widget application) on a desktop with user B. When user B wants to call user A, user B does not need to query for the current time of a city where user A is located (because of a time difference abroad) by other means, downloads the time widget application shared by user A and loads the time data through the network link, which is equivalent to directly viewing the shared clock widget on the desktop of user A, and is capable of learning the time of the country or city where user A is located. Similarly, a weather condition of the city where user A is located currently may also be instantly learned. It should be understood that, if user B is only interested in the time widget application of user A, user B may acquire the clock widget application shared by user A through the network link only. In this way, the time of the location of user B may be displayed on a user equipment of user B using the time widget application of user A. Alternatively, if user B only wants to learn the current time of the location of user A, user B may only acquire time data of user A and load in a time widget application of the user equipment of user B.

For example, user C and user D are friends and share a desktop. User C may view, on the shard desktop, that user D is listening to music. If user C also wants to listen to the piece of music, user C may click information about the piece of music that user D is playing. Then, the network performs searching and provides an online music link of the piece of music for user C. In this way, user C is capable of playing the piece of online music using a player of user C. Alternatively, user D views an icon of a mini game on the shared desktop. If user D also wants to play the game, user D may click a game icon on the shared desktop. Then, the network performs searching and downloads the game onto the desktop of user D.

In addition, a group member may trace status of other group members in real time using a shared desktop. For example, user E, user F, and user G are colleagues in a project team and they share a desktop. The desktop is a group desktop. If user E places a game icon on the shared group desktop, user F and user G are capable of viewing the game icon on the group desktop and downloading the game onto their own desktops.

As may be seen from the above, the shared desktop is capable of displaying shared information for a sharing object in all dimensions, facilitating viewing of the shared information, and easily acquiring a shared application and shared resources.

The preceding data information such as time, weather, city, and ID3 information may be displayed in the form of a data file or the form of a file icon.

On the basis of implementation of information sharing, the foregoing describes a method for implementing desktop sharing with reference to a specific embodiment. For ease of description, the foregoing takes desktop sharing between only two users as an example. It should be understood that a method for implementing desktop sharing between more users is similar to that for implementing desktop sharing between two users. Similarly, the first user is a provider who provides shared information, and the second user is a sharing object of the first user.

Figure 7:
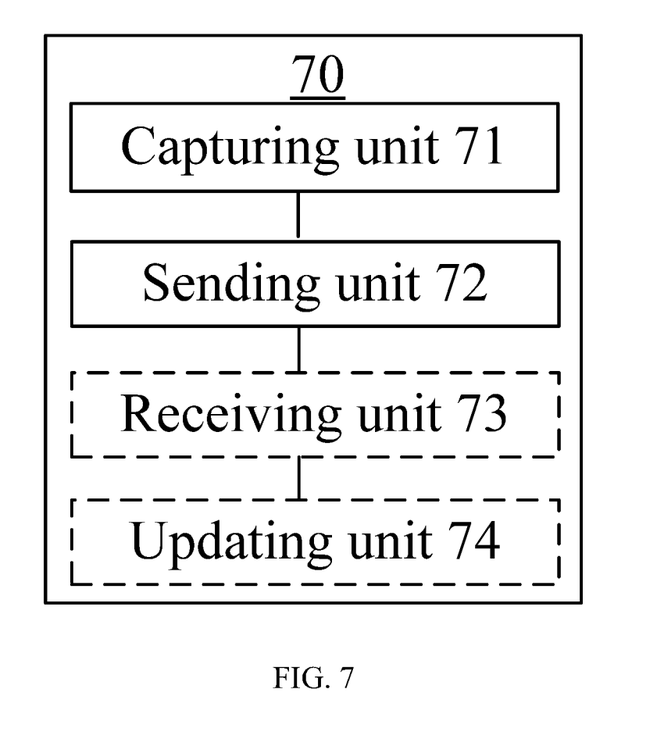
FIG. 7 is a schematic structural diagram of an apparatus for implementing desktop sharing according to an embodiment of the present disclosure.

Base on the above content, the present disclosure further provides an apparatus for implementing desktop sharing. Referring to FIG. 7, the apparatus 70 for implementing desktop sharing may include a capturing unit 71 and a sending unit 72. The capturing unit 71 is configured to capture information about a first change of shared information on a desktop of a user equipment and/or of location information corresponding to the shared information. When the shared information is changed, the capturing unit 71 captures the changed shared information; when the location information corresponding to the shared information is changed, the capturing unit 71 captures the changed location information; and when both the shared information and the location information corresponding to the shared information are changed, the capturing unit 71 captures the changed shared information and location information. The sending unit 72 is configured to send the information about the first change to a cloud server for storage. Generally, the capturing unit 71 periodically captures information about a first change of shared information on a desktop of a user equipment and/or of location information corresponding to the shared information. Here, the location information indicates a location for the shared information to be displayed on the desktop of the user equipment. In addition, the apparatus 70 for implementing desktop sharing may further include a receiving unit 73 and an updating unit 74. The receiving unit 73 receives, from the cloud server, information about a second change of shared information on a desktop of another user equipment and/or location information corresponding to the shared information. The updating unit 74 updates, according to the information about the second change of the shared information on the desktop of the another user equipment and/or the location information corresponding to the shared information, shared information on a desktop of its user equipment and/or location information corresponding to the shared information. Generally, the receiving unit 73 periodically receives, from the cloud server, information about a second change of shared information on a desktop of a user equipment of another user and/or location information corresponding to the shared information.

Here, the shared information includes but is not limited to one or more of the following types of information: a network link, an application operation parameter, and a file.

In this way, in this embodiment, information can be shared in real time between two or more user equipments, so that a user of a user equipment is capable of tracing the status of a user of another user equipment and acquiring information on a shared desktop in real time.

Persons skilled in the art should appreciate that, in combination with the examples described in the embodiments here, units and algorithm steps can be implemented by electronic hardware, or a combination of computer software and electronic hardware. Whether the functions are executed by hardware or software depends on the particular applications and design constraint conditions of technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus and unit, reference may be made to the corresponding process in the method embodiments, and the details are not described here again.

In the embodiments provided in the present application, it should be understood that the disclosed system, apparatus, and method may be implemented in other manners. For example, the apparatus embodiments described above are merely exemplary. For example, unit division is merely logical function division and may be other division in actual implementation. For example, multiple units or components may be combined or integrated into another system, or some features may be ignored or not performed. In addition, the displayed or discussed mutual couplings or direct couplings or communication connections are implemented through some interfaces. The indirect couplings or communication connections between devices or units may be implemented in electronic, mechanical or other forms.

The units described as separate parts may or may not be physically separate, and parts displayed as units may or may not be physical units, that is, may be located in one position, or may be distributed on multiple network elements. A part or all of the units may be selected according to actual needs to achieve the objectives of the solutions of the embodiments.

In addition, functional units in the embodiments of the present disclosure may be integrated into a processing unit, or each of the units may exist alone physically, or two or more units are integrated into a unit.

When being implemented in the form of a software functional unit and sold or used as a separate product, the functions may be stored in a computer-readable storage medium. Based on such understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, and the like) to execute all or part of the steps of the method described in the embodiment of the present disclosure. The storage medium includes any medium that may store program codes, such as a U-disk, a removable hard disk, a read-only memory (ROM), a random access memory (RAM), a magnetic disk, or an optical disk.

The foregoing descriptions are merely exemplary embodiments of the present disclosure, but not intended to limit the protection scope of the present disclosure. Any variation or replacement made by persons skilled in the art without departing from the spirit of the present disclosure shall fall within the protection scope of the present disclosure. Therefore, the protection scope of the present disclosure shall be subject to the appended claims.

What is claimed is:

1. A method for implementing information sharing, implemented by a second mobile device, comprising:
   receiving shared information from a first mobile device, wherein the shared information comprises an operation parameter of an application of the first mobile device and location information of the application which indicates a location for the application to be displayed on a display of the second mobile device;
   determining whether the second mobile device has the application installed;
   downloading and installing the application when determining that the second mobile device does not have the application installed;
   placing and displaying the application on a location of the display of the second mobile device according to the location information;
   loading the operation parameter on the application such that the second mobile device traces a status of the application of the first mobile device on the second mobile device; and
   displaying information associated with the operation parameter on the location of the display of the second mobile device,
   wherein the first mobile device displays a set of content corresponding to the application on a display of the first mobile device, and
   wherein the second mobile device displays the same set of content corresponding to the application on the display of the second mobile device.

2. The method according to claim 1, wherein the application comprises a widget, and wherein the operation parameter from the first mobile device comprises time information, weather information, or region information that is loaded on the widget.

3. The method according to claim 1, wherein the application comprises an audio player, and wherein the operation parameter from the first mobile device comprises information about an audio file played in the audio player.

4. The method according to claim 1, wherein the first mobile device and the second mobile device are communicatively connected to a server, and wherein receiving the shared information from the first mobile device comprises the second mobile device receiving the shared information from the server.

5. The method according to claim 4, further comprising:
periodically receiving an updated operation parameter corresponding to the application from the first mobile device; and
loading the updated operation parameter on the application of the second mobile device.

6. The method according to claim 4, wherein before receiving the shared information from the first mobile device, the second mobile device manually sends a download request to the server to download the shared information.

7. The method according to claim 4, wherein before receiving the shared information from the first mobile device, the second mobile device automatically sends a download request to the server to download the shared information based on a timer.

8. The method according to claim 4, wherein before receiving the shared information from the first mobile device, the second mobile device receives a sharing notification message and sends a download request to the server based on receiving the sharing notification message.

9. A mobile device, comprising:
a display;
one or more processors coupled to the display; and
a memory coupled to the one or more processors and storing programming for execution by the one or more processors, wherein the programming includes instructions for:
receiving shared information from a first mobile device, wherein the shared information comprises an operation parameter of an application of the first mobile device and location information of the application which indicates a location for the application to be displayed on the display;
determining whether the mobile device has installed the application;
downloading and installing the application when determining that the mobile device does not have the application installed;
placing and displaying the application on a location of the display according to the location information;
loading the operation parameter on the application such that the mobile device traces a status of the application of the first mobile device on the mobile device; and
displaying information associated with the updated operation parameter on the location of the display,
wherein the first mobile device displays a set of content corresponding to the application on a display of the first mobile device, and
wherein the mobile device displays the same set of content corresponding to the application on the location of the display of the mobile device.

10. The mobile device according to claim 9, wherein the application comprises a widget, and wherein the operation parameter from the first mobile device comprises time information.

11. The mobile device according to claim 9, wherein the application comprises a widget, and wherein the operation parameter from the first mobile device comprises weather information.

12. The mobile device according to claim 9, wherein the application comprises a widget, and wherein the operation parameter from the first mobile device comprises region information that is loaded on the widget.

13. The mobile device according to claim 9, wherein the first mobile device and the mobile device are communicatively connected to a server, and wherein receiving the shared information from the first mobile device comprises the mobile device receiving the shared information from the server.

14. The mobile device according to claim 13, wherein the programming further includes instructions for:
periodically receiving an updated operation parameter corresponding to the application from the first mobile device; and
loading the updated operation parameter on the application of the second mobile device.

15. The mobile device according to claim 13, wherein before receiving the shared information from the first mobile device, the mobile device manually sends a download request to the server to download the shared information.

16. The mobile device according to claim 13, wherein before receiving the shared information from the first mobile device, the mobile device automatically sends a download request to the server to download the shared information based on a timer.

17. The mobile device according to claim 13, wherein before receiving the shared information from the first mobile device, the mobile device receives a sharing notification message and sends a download request to the server based on receiving the sharing notification message.

18. The mobile device according to claim 13, wherein before receiving the shared information from the first mobile device, the mobile device is authenticated by the server.

19. A method for implementing information sharing, implemented by a second mobile device, comprising:
receiving shared information from a first mobile device, wherein the shared information comprises a weather widget, weather information on the first mobile device, and location information of the weather widget which indicates a location for the weather widget to be displayed on a display of the second mobile device;
determining whether a weather widget on the second mobile device is consistent with a weather widget on the first mobile device;
downloading and installing a weather widget on the second mobile device when determining that the weather widget on the second mobile device is not consistent with the weather widget on the first mobile device;
placing and displaying the weather widget on a location of the display of the second mobile device according to the location information of the weather widget;
loading the weather information on the installed weather widget such that the second mobile device learns the weather information of a location of the first mobile device; and
displaying information associated with the weather information on the location of the display of the second mobile device,
wherein the first mobile device displays a set of weather information on a display of the first mobile device, and
wherein the second mobile device displays the same set of weather information on the location of the display of the second mobile device.

* * * * *